(12) United States Patent
Marathe et al.

(10) Patent No.: US 8,732,682 B2
(45) Date of Patent: May 20, 2014

(54) SYSTEMS AND METHODS FOR DETECTING AND TOLERATING ATOMICITY VIOLATIONS BETWEEN CONCURRENT CODE BLOCKS

(75) Inventors: Virendra J. Marathe, Florence, MA (US); David Dice, Foxboro, MA (US)

(73) Assignee: Amazon Technologies, Inc., Reno, NV (US)

( * ) Notice: Subject to any disclaimer, the term of this patent is extended or adjusted under 35 U.S.C. 154(b) by 326 days.

(21) Appl. No.: 13/213,830

(22) Filed: Aug. 19, 2011

(65) Prior Publication Data

US 2013/0047163 A1 Feb. 21, 2013

(51) Int. Cl.
*G06F 9/45* (2006.01)
(52) U.S. Cl.
USPC ............ 717/141; 717/136; 717/139; 717/140
(58) Field of Classification Search
None
See application file for complete search history.

(56) References Cited

U.S. PATENT DOCUMENTS

| 5,709,114 | A | * | 1/1998 | Dawson et al. | 70/278.2 |
| 5,924,313 | A | * | 7/1999 | Kuo | 70/26 |
| 6,530,020 | B1 | * | 3/2003 | Aoki | 713/163 |
| 6,583,712 | B1 | * | 6/2003 | Reed et al. | 340/5.21 |
| 7,221,272 | B2 | * | 5/2007 | Hosselet | 340/542 |
| 7,747,996 | B1 | * | 6/2010 | Dice | 717/169 |
| 7,752,605 | B2 | * | 7/2010 | Qadeer et al. | 717/127 |
| 7,941,616 | B2 | * | 5/2011 | Rajamani et al. | 711/152 |
| 2003/0208500 | A1 | * | 11/2003 | Daynes et al. | 707/100 |
| 2006/0282476 | A1 | * | 12/2006 | Dolby et al. | 707/201 |
| 2007/0143477 | A1 | * | 6/2007 | Kaminsky et al. | 709/225 |
| 2008/0109641 | A1 | * | 5/2008 | Ball et al. | 712/216 |
| 2009/0044174 | A1 | * | 2/2009 | Dolby et al. | 717/127 |
| 2009/0077540 | A1 | * | 3/2009 | Zhou et al. | 717/126 |
| 2010/0100690 | A1 | * | 4/2010 | Rajamani et al. | 711/152 |
| 2010/0192131 | A1 | * | 7/2010 | Dolby et al. | 717/126 |
| 2010/0218571 | A1 | * | 9/2010 | Basche | 70/302 |
| 2010/0281469 | A1 | * | 11/2010 | Wang et al. | 717/128 |
| 2011/0167412 | A1 | * | 7/2011 | Kahlon et al. | 717/128 |
| 2012/0117544 | A1 | * | 5/2012 | Kakulamarri et al. | 717/126 |
| 2012/0123739 | A1 | * | 5/2012 | Sethumadhavan et al. | 702/186 |

OTHER PUBLICATIONS

Shan Lu, et al., "AVIO: Detecting Atomicity Violations via Access Interleaving Invariants," ASPLOS'06 Oct. 21-25, 2006, San Jose, California, USA, Copyright 2006 ACM, 12 pages.

(Continued)

*Primary Examiner* — Chameli Das
(74) *Attorney, Agent, or Firm* — Robert C. Kowert; Meyertons, Hood, Kivlin, Kowert & Goetzel, P.C.

(57) ABSTRACT

The system and methods described herein may be used to detect and tolerate atomicity violations between concurrent code blocks and/or to generate code that is executable to detect and tolerate such violations. A compiler may transform program code in which the potential for atomicity violations exists into alternate code that tolerates these potential violations. For example, the compiler may inflate critical sections, transform non-critical sections into critical sections, or coalesce multiple critical sections into a single critical section. The techniques described herein may utilize an auxiliary lock state for locks on critical sections to enable detection of atomicity violations in program code by enabling the system to distinguish between program points at which lock acquisition and release operations appeared in the original program, and the points at which these operations actually occur when executing the transformed program code. Filtering and analysis techniques may reduce false positives induced by the transformations.

20 Claims, 7 Drawing Sheets

(56) References Cited

OTHER PUBLICATIONS

Cormac Flanagan, et al., "Velodrome: A Sound and Complete Dynamic Atomicity Checker for Multithreaded Programs," PLDI'08, Jun. 7-13, 2008, Tucson, Arizona, USA, Copyright 2008 ACM, 11 pages.

Sriram Rajamani, et al., "Isolator: Dynamically Ensuring Isolation in Concurrent Programs," ASPLOS'09, Mar. 7-11, 2009, Washington, DC, USA, Copyright 2009 ACM, 12 pages.

Cormac Flanagan, et al., "A Type and Effect System for Atomicity," PLDI'03, Jun. 9-11, 2003, San Diego, California, USA, Copyright 2003 ACM, 12 pages.

Pedro C. Diniz, et al., "Lock Coarsening: Eliminating Lock Overhead in Automatically Parallelized Object-Based Programs," University of California, Santa Barbara, 1996, 29 pages.

Dawson Engler, et al., "RacerX: Effective, Static Detection of Race Conditions and Deadlocks," SOSP'03, Oct. 19-22, 2003, Bolton Landing, New York, USA, Copyright 2003 ACM, 16 pages.

Thomas A. Henzinger, et al., "Race Checking by Context Inference," PLDI'04, Jun. 9-11, 2004, Washington, DC, USA, Copyright 2004 ACM, 13 pages.

Paruj Ratanaworabhan, et al., "Detecting and Tolerating Asymmetric Races," PPoPP'09 Feb. 14-18, 2009, Raleigh, North Carolina, USA, Copyright © 2009 ACM, 12 pages.

Mayur Naik, et al., "Effective Static Race Detection for Java," PLDI'06 Jun. 11-14, 2006, Ottawa, Ontario, Canada, Copyright 2006 ACM, 12 pages.

Polyvios Pratikakis, et al., "Locksmith: Context-Sensitive Correlation Analysis for Race Detection," PLDI'06 Jun. 11-14, 2006, Ottawa, Ontario, Canada, Copyright 2006 ACM, 12 pages.

Min Xu, et al., "A Serializability Violation Detector for Shared-Memory Server Programs," PLDI'05, Jun. 12-15, 2005, Chicago, Illinois, USA, Copyright 2005 ACM, 14 pages.

Brandon Lucia, et al., "Atom-Aid: Detecting and Surviving Atomicity Violations," 2009 IEEE, pp. 73-83.

Bohuslav Krena, et al., "Healing Data Races On-The-Fly," PADTAD'07, Jul. 9, 2007, London, England, United Kingdom, Copyright 2007 ACM, 11 pages.

Cormac Flanagan, et al., "Atomizer: A Dynamic Atomicity Checker For Multithreaded Programs," POPL'04, Jan. 14-16, 2004, Venice, Italy, Copyright 2004 ACM, 12 pages.

Soyeon Park, et al., "CTrigger: Exposing Atomicity Violation Bugs from Their Hiding Places," ASPLOS'09 Mar. χ 11, 2009, Washington, DC, USA, Copyright 2009 ACM, 12 pages.

\* cited by examiner

SYSTEMS AND METHODS FOR DETECTING AND TOLERATING ATOMICITY VIOLATIONS BETWEEN CONCURRENT CODE BLOCKS

BACKGROUND

1. Field of the Disclosure

This disclosure relates generally to concurrent programming, and more particularly to systems and methods for detecting and tolerating atomicity violations between concurrent code sections.

2. Description of the Related Art

Shared memory concurrent programming is becoming ubiquitous because of the ongoing influx of multi-core systems in mainstream computing environments. In such environments, a common means of communication between concurrent computations is via synchronized critical sections (or atomic blocks). However, correctly synchronizing access to shared memory is complicated, and is a source of some of the most difficult programming errors to solve in concurrent programs. One flavor of synchronization bugs in concurrent programs is atomicity violation bugs, such as those that are the result of a mismatch between the exact boundaries of critical sections required for the program to be correct (boundaries that disallow access interleaving that may lead to unexpected and/or incorrect program behavior), and the implementation of these boundaries in actual program code.

Data races are a well-known form of atomicity violation bugs. A concurrent program is said to have a data race when two or more threads access a shared memory location (with at least one access being a write) without synchronizing with each other. Such races can lead to unpredictable program behavior. Techniques to detect data races include type system support, extensive static analyses, and on-the-fly dynamic race detection techniques. Most of these approaches, other than the type system based approaches, tackle the race detection problem in one of two ways: happens-before analysis (in which the system determines a happens-before relationship between all shared memory accesses and synchronization points in the program, and assumes a data race in cases in which two memory accesses are not ordered by the happens-before relationship), and lock set analysis (in which the system dynamically maps each shared memory location to a set of locks, and infers a data race in situations in which a location is inconsistently protected by locks). There are advantages and disadvantages to each of these approaches. For example, the happens-before approach is precise, but extremely slow, and the lock set analysis approach is faster, but less precise. Some hybrid approaches improve upon these individual approaches, but are still far from being practically viable.

Some program analysis techniques have been used to determine blocks of code that are incorrectly unprotected by one or more locks, which can lead to data races. Another current technique uses static inference of critical sections to avoid atomicity violations. However, this approach restricts a critical section to just one define-use chain. Other atomicity violation detection tools track shared memory access interleavings, and establish specific invariants on what access interleavings are correct using trial runs of programs that are deemed to be correct. This tracking is expensive and results in orders of magnitude slowdowns during execution time. Still other techniques take a hardware-centric approach, such as leveraging bulk memory disambiguation hardware to inflate atomically executed blocks of code, or leveraging the memory protection hardware available in commodity processors.

SUMMARY

The systems and methods described herein may apply a dynamic approach to detecting and tolerating atomicity violations in concurrent programs. In some embodiments, the techniques described herein may be used transparently inflate critical sections by advancing a lock acquisition operation and/or delaying a lock release operation to points deemed (by systematic data flow analysis and/or profiling based filtering) to be "safer" than the lock acquisition and/or lock release sites in the original program code. The techniques described herein may in some embodiments be used to inject new lock acquire and corresponding lock release operations around code blocks that are determined to be accessed concurrently (e.g., to transform non-critical code blocks that are determined by the system to be likely candidates for atomicity violations because they access a shared object without proper synchronization), into critical sections. In some embodiments, the techniques described herein may be used to coalesce multiple neighboring critical sections into one big critical section, if appropriate.

The techniques described herein may utilize an auxiliary lock state indication associated with a lock on a critical section to enable detection of atomicity violations in program code. In various embodiments, a new compiler, runtime, and profiling based approach may ameliorate the atomicity violation problem by both detecting and tolerating some atomicity violations in concurrent programs and/or generating code that when executed detects and tolerates such violations.

In various embodiments, the auxiliary lock state may enable the system to distinguish between the program points at which lock acquisition operations and lock release operations were stated in the original program, and the points at which the lock acquisition operations and lock release operations actually occur at run time (i.e. when executing the transformed program code). This information may be used by the runtime system to detect potential atomicity violations. False positives, which can be a big issue in atomicity violation and data race detection tools, may in some embodiments be significantly reduced using various filtering and analysis techniques.

In some embodiments, a method for generating code that detects and tolerates atomicity violations in original program code (e.g., using a JIT compiler or another type of compiler or profiling tool) may include analyzing program code to determine whether there exists a potential for atomicity violations between two or more sections of the code when they are executed by different threads. In response to determining that such a potential for atomicity violations exists, the compiler may transform the original program code into alternate code that when executed tolerates at least some of the potential atomicity violation in the program code that are discovered by the analysis. The compiler may then output the alternate code for execution on a multithreaded computer.

In some embodiments, transforming the program code includes inserting ownership acquisition and corresponding ownership release operations into the alternate code that target one or more locks, each of which protects a respective code section. In the alternate code, each of the locks may include (or be associated with) a respective composite lock state indicator that includes a current lock state indicator and an original lock state indicator. At any given point during execution of the alternate code, the value of the original lock state indicator may indicate whether a respective lock would have been held according to the original program code, and the value of the current lock state indicator may indicate whether the respective lock is actually being held.

As described in more detail herein, in some embodiments, determining that a potential for atomicity violations exists may include determining that one or more define-use chains exist between two or more nearby synchronized sections of the program code or between two or more nested synchronized sections of the program code. In such embodiments, transforming the program code may include inflating one of the synchronized code sections. In other embodiments, determining that a potential for atomicity violations exists may include determining that an unsynchronized section of the program code accesses the same object or objects as a synchronized section of the program code. In such embodiments, transforming the program code may include injecting a lock acquisition operation and a corresponding lock release operation around the unsynchronized section of the program code (e.g., targeting the same or a new lock). In still other embodiments, determining that a potential for atomicity violations exists may include determining that two or more nearby synchronized sections of the program code appear to access the same object or objects. In such embodiments, transforming the code may include coalescing two or more nearby synchronized sections of the program code into a single synchronized code section that encompasses those synchronized code sections and that is protected by a new lock. In embodiments in which a new lock is introduced in the alternate code, the value of the original lock state indicator for the new lock may indicate that the new lock would not have been held according to the original program code (since it did not exist in the original program code).

In some embodiments, after generating code that tolerates atomicity violations that may have existed in the original program code, the alternate code may be executed. In such embodiments, executing the alternate code may include detecting, at runtime, a possible atomicity violation in the original program code dependent on the respective composite lock state indicator associated with one of the one or more locks. In some embodiments, an atomicity violation warning corresponding to the detected possible atomicity violation may be logged in a memory for subsequent analysis. In response to determining that the detected possible atomicity violation is a false positive rather than an actual atomicity violation in the original program code (e.g., a false positive induced by a transformation applied to the program code), the transformation of a code section corresponding to the false positive may be reversed or otherwise marked for subsequent removal.

Figure 1:
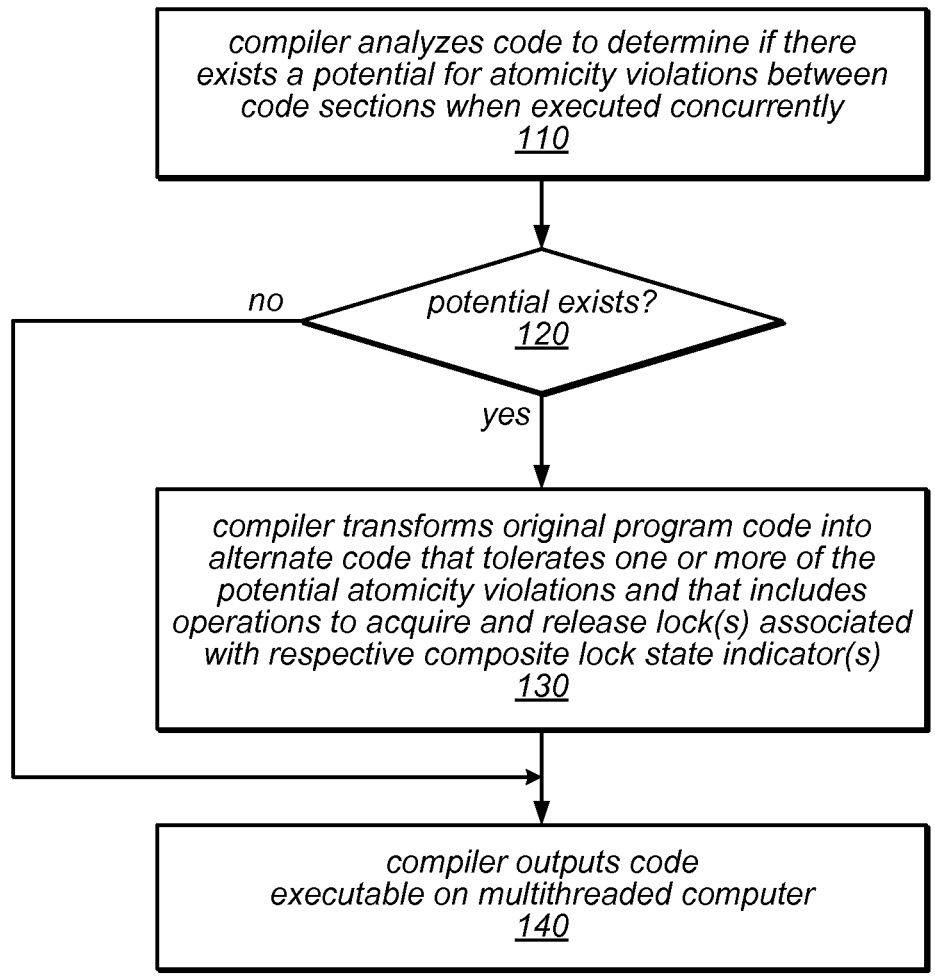
FIG. 1 is a flow diagram illustrating one embodiment of a method for generating code that is executable to detect and/or tolerate atomicity violations, as described herein.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

The systems and methods described herein may provide a new approach to atomicity violation detection and tolerance. In some embodiments, various techniques described herein may be used to transparently transform non-critical code blocks that are determined by the system to be likely candidates for atomicity violations (e.g., they access a shared object without proper synchronization), into critical (i.e. synchronized) code sections. The techniques described herein may also be used to inflate existing critical sections by advancing the lock acquisition operation and/or delaying the lock release operation to points deemed to be safer by the system. In some embodiments, the techniques described herein may be used to coalesce multiple neighboring critical sections into one big critical section, where necessary. To these techniques, new auxiliary states may be added to locks that enable the system to distinguish between the program points at which the lock acquire and release operations were originally stated in the program, and the points at which the lock acquire and release operations actually happen at runtime. In various embodiments, this information may be used by the runtime system to detect potential atomicity violations. In some embodiments, false positives, which can be a big issue in atomicity violation and data race detection tools, may be significantly reduced using trial-runs-based-filtering techniques.

A large class of problems that has been recently investigated includes atomicity violation detection and tolerance problems. Atomicity violations can occur even in programs that are data race free. As an example, consider the following code fragment, defines three synchronized blocks of a StringBuffer class:

```
public final class StringBuffer {
    ...
    ...
    public synchronized StringBuffer append(StringBuffer sb){
        if (sb = = null) { sb = NULL; }
        int len = sb.length( ); // len may be stale
```

```
        int newcount = count + len;
        if (newcount > value.length) expandCapacity(newcount);
        sb.getChars(0, len, value, count); // use of stale len
        count = newcount;
        return this;
    }
    public synchronized int length( ) { return count; }
    public synchronized void getChars(...) { ... }
    ...
    ...
}
```

In this example, although synchronized blocks protect all accesses to fields of the StringBuffer instance, there is an atomicity violation in the program. Specifically, the value of StringBuffer's length field could change between its retrieval and the use of the retrieved value, thus potentially leading to an ArrayIndexOutOfBoundsException. Currently proposed atomicity violation detection tools either extend the language's type system and require programmer annotations, extend the hardware architecture, or analyze and establish invariants for shared memory access interleaving. However, as discussed above, there are disadvantages to each of these approaches.

The techniques described herein are illustrated in terms of their application to object oriented, type safe languages, such as the Java™ programming language. As such, the techniques may in some embodiments assume that each object has an embedded monitor or lock that is typically used to synchronize accesses to the object (and/or its fields). For example, it may be assumed that a lock acquisition type operation is performed at the entry point of any synchronized methods/blocks that access a shared object and that a lock release type operation is performed at the exit point of such methods/blocks. In many of the examples included herein, the description may assume object level granularity of locking. However, in other embodiments (e.g., for programs that use locks at a finer, field-level granularity), the runtime may infer the correlation between such locks and object fields.

The systems and methods described herein may be illustrated in terms of the StringBuffer example above. It has been observed that one way to avoid the atomicity violation in that example is to "float" (i.e. re-locate) the lock release operation for the parameter StringBuffer to the end of the enclosing critical section. In other words, lock release operations for the parameter StringBuffer may be relocated from their positions at the ends of the StringBuffer.length() method and the StringBuffer.getChars( ) method to the end of StringBuffer. append() method. In managed environments such as the Java™ virtual machine (or JVM) this can be done transparently by the runtime system for nested critical sections.

Another real world example of a program in which atomicity violations should be avoided is a bank balance transfer transaction in which the withdrawal from one account and the corresponding deposit to the other account all need to happen atomically. For modularity, a programmer may implement the withdraw( ) and deposit( ) methods as synchronized methods as follows:

```
public synchronized float withdraw(float request) {
    if (balance > request) {
        balance -= request;
        return request;
    } else {
        throw new OverdraftException(this);
```

```
    }
}
public synchronized void deposit(float amount) {
    balance += amount;
}
```

In this example, the balance transfer operation can be written as follows:

```
public transfer (Account src, Account dst, float amount) {
    float withdrawnAmount = src.withdraw(amount);
    dst.deposit(withdrawnAmount);
}
```

This implementation of balance transfer may appear to be correct. The overall operation is not explicitly atomic, but some applications may be able to tolerate such non-atomicity. However, applications are seldom this simplistic. For example, bank accounts can be closed concurrently, which complicates the above transaction. In an alternate version of the program, if the first statement in both withdraw( ) and deposit( ) is a check to see if the source account (src) has been closed and if so to throw an AccountClosed exception, then the balance transfer method becomes somewhat more complicated. Similarly, the destination account (dst) may have closed, which could lead to an AccountClosed exception, and the program would have to roll back the withdrawal from the source account. In this alternate version, the transfer method may be as follows:

```
public transfer (Account src, Account dst, float amount) {
    float withdrawnAmount;
    try {
        withdrawnAmount = src.withdraw(amount);
        dst.deposit(withdrawnAmount);
    } catch (AccountClosed ex) {
        if (ex.account = = dst) {
            // roll back withdrawal from src
            src.deposit(withdrawnAmount);
        }
    }
}
```

However, this alternate version still includes an error. For example, a concurrent withdrawal from the source account (happening between the above withdrawal and rollback operations) could incorrectly lead to an OverdraftException. Although there exist solutions to this problem, programmers are prone to make such mistakes. The techniques described herein may be used to avoid such atomicity violation problems by floating the lock release for the source account to the end of the transfer( ) method. Thus, even in the case of an AccountClosed exception for the destination account, the lock for src would be held until the manual rollback of src's withdrawal operation happens. Such a feature (i.e. one that is able to detect and tolerate atomicity violations in program code) may be extremely valuable for production runs of applications that could otherwise break in arbitrary ways due to such violations.

FIG. 1 illustrates one embodiment of a method for generating code that when executed is able to detect and/or tolerate atomicity violations. As illustrated at 110, in this example, the method may include a compiler (which may in various embodiments be a just-in-time, or JIT, compiler or another type of compiler) analyzing code (e.g. original program code) to determine if there exists a potential for atomicity violations between sections of the code when they are subsequently executed concurrently (e.g., by different threads in a multi-threaded computing system). For example, the original program code may include code sections that are designed for concurrent execution in a multithreaded environment (such as in a computing system that includes multiple processors or processor cores) and those code sections (each of which may or may not be designated as a synchronized block) may access one or more shared objects. As described in more detail herein, the compiler may apply a variety of techniques in analyzing the original program code to determine whether the potential for atomicity violations between code sections exists.

If the compiler determines, through its analysis, that the potential for atomicity violations between code sections exists (shown as the positive exit from 120), the method may include the compiler transforming the original program code into alternate program code that tolerates at least some of the potential atomicity violations, as in 130. As illustrated in this example, the alternate code may include operations to acquire and release one or more locks that are associated with respective composite lock state indicators (each of which may include an original lock state indicator and a current lock state indicator). In various embodiments, in transforming the original program code into the alternate program code, the compiler may replace one or more acquire/release operations targeting existing locks (e.g., locks associated with synchronized blocks or critical sections in the original program code) with acquire/release operations targeting locks whose lock state indicators have been augmented to reflect an auxiliary lock state, may inject acquire/release operations targeting one or more additional locks that include (or are associated with) a composite lock state indicator, and/or may re-locate acquire/release operations targeting one or more locks that include (or are associated with) a composite lock state indicator. The compiler may then output code that is executable on a multithreaded computer, as in 140.

If the compiler determines, through its analysis, that the potential for atomicity violations between code sections does not exist (shown as the negative exit from 120), the original code may not be transformed in the manner described herein. In this case, the compiler may still output code executable on a multithreaded computer (as in 140), but this executable code may not include the mechanisms described herein for detecting and tolerating atomicity violations between concurrently executing code sections.

Note that the compiler may perform other functions, including other types of transformations or optimizations not described herein (e.g., transformations or optimizations unrelated to the atomicity of concurrent code sections) when generating code that is executable on a multithreaded computer from original (i.e. source) code.

Figure 2:
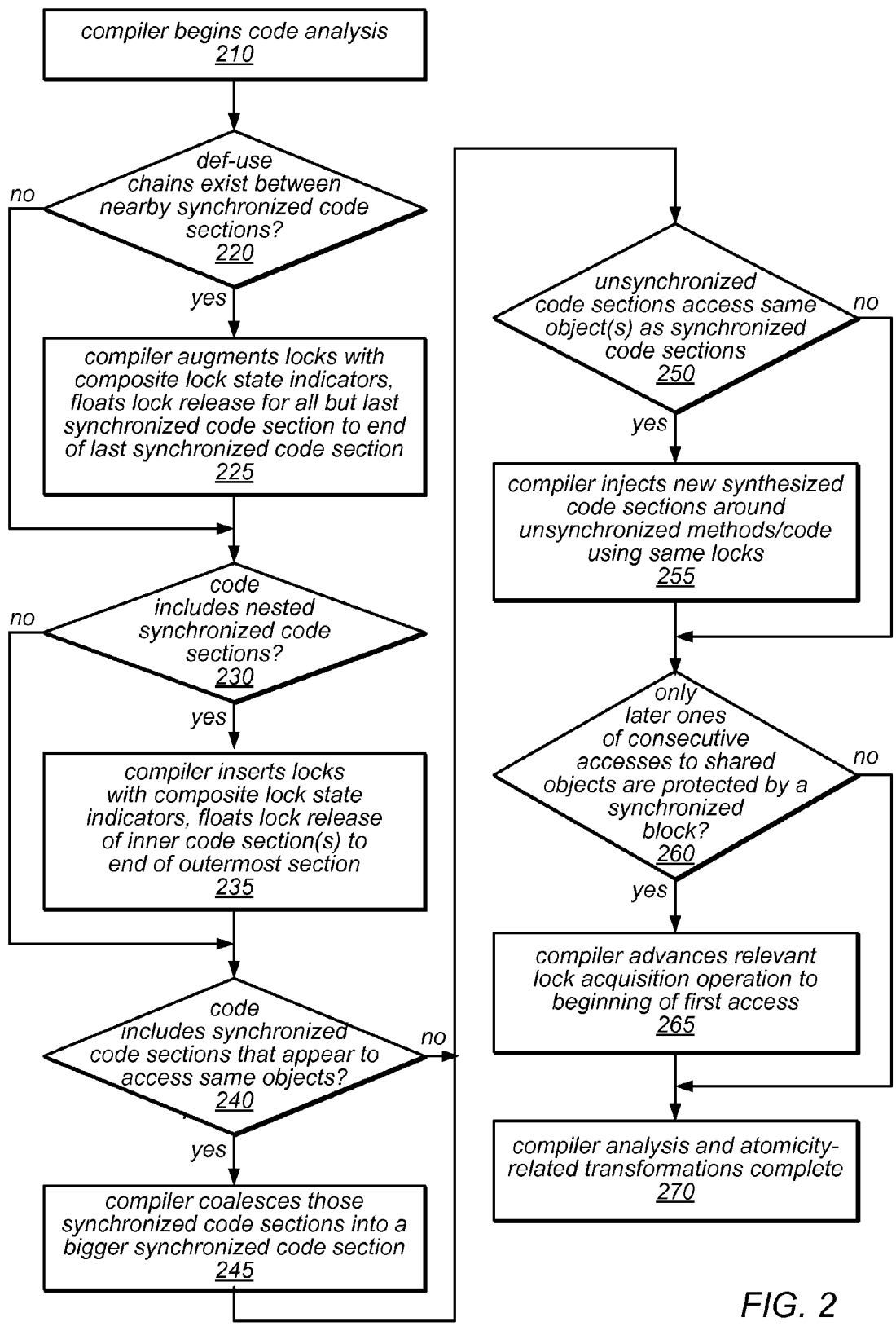
FIG. 2 is a flow diagram illustrating a method for transforming original program code into alternate code that is executable to detect and/or tolerate atomicity violations using composite lock state indicators, according to one embodiment.

FIG. 2 illustrates a method for transforming original program code into alternate code that is executable to detect and/or tolerate atomicity violations using composite lock state indicators, according to one embodiment. As illustrated in this example, the compiler may apply a variety of techniques in analyzing the original program code and transforming it into the alternate code. In various embodiments, any one or more of these techniques may be applied to analyze and/or transform the code of a particular original program. As illustrated in this example, the method may include a compiler (e.g., a JIT compiler of a JVM environment, or another type of compiler) beginning a code analysis exercise (as in 210). In some embodiments, if the compiler observes that two or more synchronized blocks appear near each other in the code (e.g., in program order), and that one or more define-use chains exist between these blocks, the compiler may infer that the this collection of synchronized blocks may be expected to execute atomically. As used herein, the term "define-use chain" may refer to a relationship between two code blocks (one or both of which may be synchronized blocks) in which the first block updates the value of an object or variable and the second block retrieves and/or uses the value of that object or variable. In response to such a determination (shown as the positive exit from 220), the compiler may "float" the lock release for all but the last synchronized block to the end of the last synchronized block, as in 225. Floating the lock release operation to the end of the last synchronized block may eliminate a source of atomicity violations in the original program code. As illustrated in this example, the compiler may also augment the lock state indicators of the existing locks in the original program code to reflect an auxiliary lock state or replace the existing locks with locks having composite lock state indicators. As previously noted, when lock acquisition and/or release operations are added and/or re-located by the compiler, the values of the two components of a composite lock state indicator may indicate (at any given point in the execution) whether the corresponding lock is (or is not) currently held and whether the corresponding lock would have been (or would not have been) held at that point in the execution according to the original (i.e. untransformed) program code. Note that similar transformations may be applied in the case of use-define chains, in which a first block uses the value of an object or variable and a second block redefines that object or variable.

In some embodiments, if the compiler observes nested synchronized blocks in the original program code (such as those included in the StringBuffer example above), the method may include the compiler floating the lock release for the inner block(s) to the end of the outermost block. This is illustrated in FIG. 2 by the positive exit from 230 and element 235. Here again, floating the lock release operation to the outermost block may eliminate a source of atomicity violations in the original program code. Note that in some embodiments, even in the absence of def-use chains between consecutive synchronized blocks, if such blocks appear to access the same objects, the compiler may assume that the programmer intends for all of the blocks to execute atomically. In such cases (shown as the positive exit from 240), the compiler may effectively coalesce multiple such synchronized blocks into a bigger synchronized block, as in 245. In such embodiments, coalescing multiple synchronized blocks into a bigger synchronized block may eliminate a source of atomicity violations in the original program code. As in other cases, the compiler may also augment the lock state indicators of the existing locks in the original program code to reflect an auxiliary lock state or replace the existing locks with locks having composite lock state indicators. As previously noted, when lock acquisition and/or release operations are added and/or re-located by the compiler, the values of the two components of a composite lock state indicator may indicate (at any given point in the execution) whether the corresponding lock is (or is not) currently held and whether the corresponding lock would have been (or would not have been) held at that point in the execution according to the original (i.e. untransformed) program code.

In some embodiments, the compiler may be configured to determine correlations between objects or fields that are accessed together in one or more synchronized blocks and that are also accessed by methods or code in one or more unsynchronized code sections, as in 250. In response to such a determination, the compiler may inject new synchronized blocks (using the same set of locks as those used to protect the synchronized blocks) around the methods/code that access some or all of the same objects or fields without any synchronization, as in 255. This injection of synchronized blocks may in some cases be a conservative response, but may not compromise correctness of the program. Boundary conditions for such inflated/injected synchronized blocks are discussed below, along with issues related to deadlocks. As in other cases, the compiler may augment the lock state indicators of the existing locks in the original program code to reflect an auxiliary lock state or replace the existing locks with locks having composite lock state indicators. As previously noted, when lock acquisition and/or release operations are added and/or re-located by the compiler, the values of the two components of a composite lock state indicator may indicate (at any given point in the execution) whether the corresponding lock is (or is not) currently held and whether the corresponding lock would have been (or would not have been) held at that point in the execution according to the original (i.e. untransformed) program code.

As illustrated in this example, in cases in which there are consecutive accesses to shared objects, and the later accesses are the only ones protected by a synchronized block (shown as the positive exit from 260), the compiler may advance the relevant lock acquisition operation to the beginning of the first access (i.e. to an earlier position in execution order), as in 265. Again, the compiler may augment the lock state indicators of the existing locks in the original program code to reflect an auxiliary lock state or replace the existing locks with locks having composite lock state indicators. As previously noted, when lock acquisition and/or release operations are added and/or re-located by the compiler, the values of the two components of a composite lock state indicator may indicate (at any given point in the execution) whether the corresponding lock is (or is not) currently held and whether the corresponding lock would have been (or would not have been) held at that point in the execution according to the original (i.e. untransformed) program code.

In the example illustrated in FIG. 2, once the determinations illustrated in elements 220, 230, 240, 250, and 260 have been made (and any corresponding code transformations have been performed), the compiler analysis and atomicity-related code transactions may be complete, as in 270. Again note that the compiler may perform other functions, including other types of transformations or optimizations not described herein (e.g., transformations or optimizations unrelated to the atomicity of concurrent code sections) when generating code that is executable on a multithreaded computer from original (i.e. source) code.

Note that in other embodiments, program analysis techniques other than those illustrated in FIG. 2 and described herein may be used to determine unprotected accesses to shared objects and inject synchronized blocks to protect these accesses. Note also that, as discussed in more detail later, various filtering mechanisms may be employed to help eliminate extraneous synchronized blocks, including those that could lead to scalability bottlenecks.

Note that simply inflating or injecting synchronized blocks in a program may in some embodiments help tolerate atomicity violations (which in itself may be very valuable), but cannot help detect such violations. In some embodiments, a detection feature with an interesting twist may be added to the lock acquisition and/or release operations. Specifically, the detection feature may take advantage of an auxiliary state that is added to the locks. For example, a lock typically has two states: acquired (meaning that the lock is currently held) or released (meaning that the lock is not currently held), and these states are represented by the value of a single lock state bit (e.g., a bit in the object header). In some embodiments, an auxiliary state indicator may be added. In some embodiments in which a single bit in the original object header represents the lock state, such a value of 0 may indicate that the lock is released, and a value of 1 may indicate that the lock is acquired. In such embodiments, another bit may be added to the object header for the auxiliary state. In such embodiments, the two lock acquisition and release states may be manipulated (as described in detail herein) to enable atomicity violation detection.

In some embodiments, the state of a lock may be represented by a composite lock state indicator that includes the two lock state bits, as in the following duple: <CurrentLockState, OriginalLockState>.

In this example, at a given program execution point P, the values of these entries for a given lock may represent the following states:

CurrentLockState=0 (if the lock is released), or 1 (if the lock is acquired/held)

OriginalLockState=0 (if the lock would have not been held in the original program at execution point P), or 1 (if the lock would have been held in the original program at execution point P).

Note that in embodiments in which new synchronized blocks are injected or existing synchronized blocks are inflated, CurrentLockState==0 may indicate that the lock is not held in both the original program and its runtime manifestation that contains the inflated/injected synchronized blocks. As a result, the auxiliary state may have no meaning when the lock is in released state (i.e. when CurrentLockState==0). The discussions below may assume that CurrentLockState==1, unless specifically stated otherwise.

Figure 3:
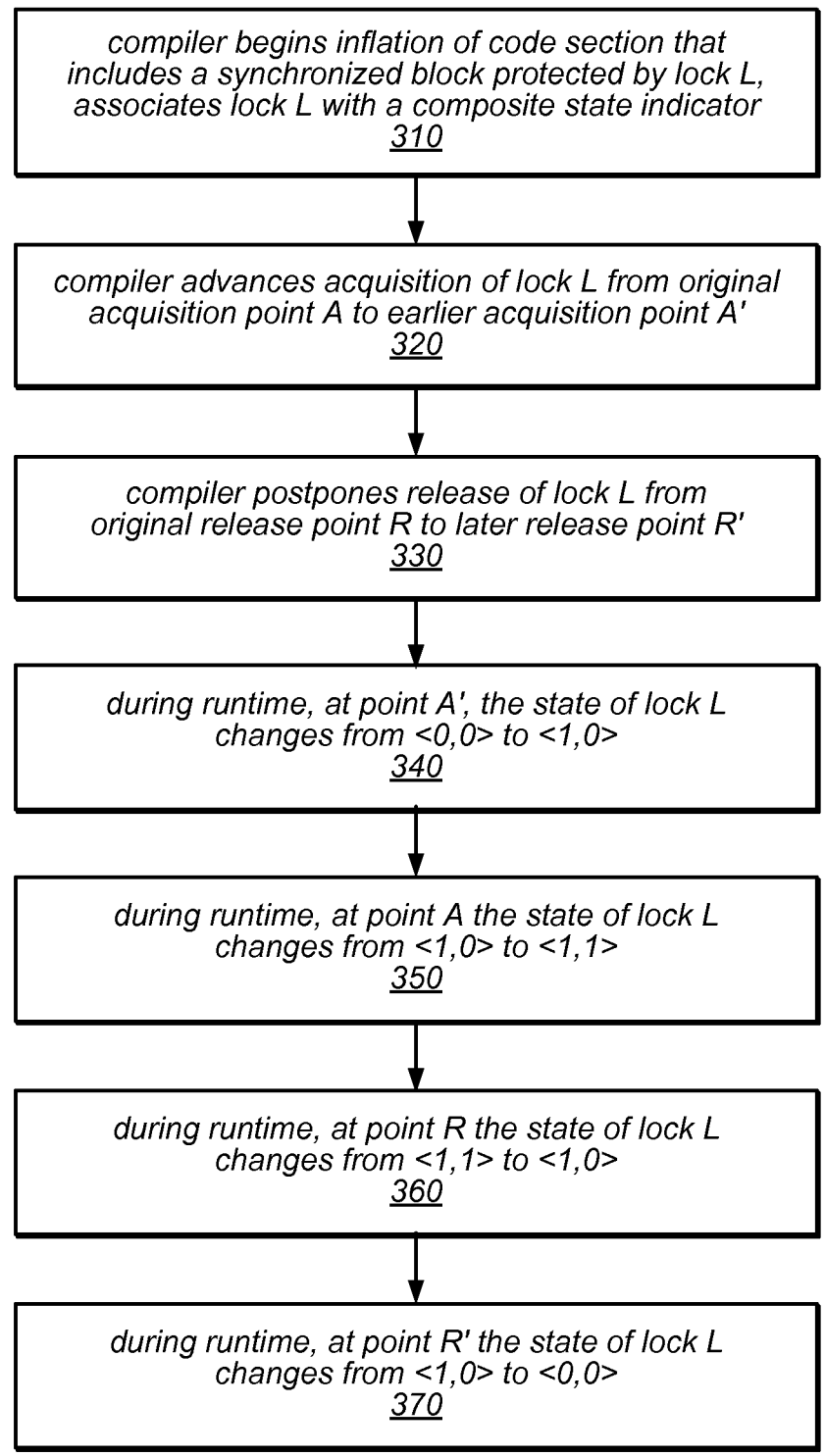
FIG. 3 is a flow diagram illustrating a method for augmenting a lock with an auxiliary state, according to one embodiment.

FIG. 3 illustrates a method for augmenting a lock with an auxiliary state, according to one embodiment. In other words, this diagram illustrates a method for generating executing code in which the state of a lock is represented by a composite lock state indicator, as described above. In this example, a compiler (e.g., a JIT compiler of a JVM environment, or another type of compiler) begins an inflation operation on a synchronized block protected by lock L, as in 310. In this example, the acquisition of lock L in the original program happens at program execution point A, and the release of lock L in the original program happens at program execution point R. As illustrated at 320 in FIG. 3, the compiler may advance the operation for acquiring lock L from its position in the original program (at point A) to an earlier point in the transformed code (which may be referred to as point A'). Similarly, the compiler may postpone the operation for releasing lock L from its position in the original program (at point R) to a later point in the transformed code (which may be referred to as point R'), as in 330.

In the example illustrated in FIG. 3, the state transformation of lock L (at runtime) may occur as follows. During the acquisition of lock L at execution point A', the system may change the state of lock L from <0,0> (assuming the lock is not currently held) to <1,0>, as in 340. This state may indicate that the lock is now held, but would not have been held at this point when executing the original program code. At execution point A, in this example, this state may be further modified from <1,0> to <1,1>, as in 350. This may indicate that the lock is now held, and that it would also have been held at this point when executing the original program code.

In this example, at execution point R, the state of lock L may be reverted from <1,1> to <1,0>, as in 360. This may indicate that while the lock is still held, it would not have been held at this point when executing the original program code. Eventually (i.e. at execution point R' in this example), the state of lock L may be changed back to its original released state <0,0>. This may indicate that the lock is no longer held and that it would not have been held at this point when executing the original program code.

As noted above, when the state of a lock is <1,0>, this may indicate that the lock owner thread could possibly be making accesses to shared objects that were unprotected by that lock in the original program. Thus, if a concurrent thread attempts to acquire a lock that is in state <1,0>, this may indicate that executing the original program could have resulted a race between the current lock owner and the new thread. In some embodiments, the detection of atomicity violations may be enabled using this technique. In some such embodiments, whenever the system detects such a violation, it may generates an in-memory log entry for the violation, which may server as an atomicity violation warning directed to the original program code. Such atomicity violation warnings may be subsequently analyzed by the programmer, and may be used to manually diagnose the problem in greater detail. Note, however, that even when there may exist a real atomicity violation in the original program code, the program may not fail, because the techniques described herein for transforming the program code (e.g., using synchronized block inflation) may avoid actual violations occurring in the program at runtime. As previously noted, this feature may be highly desirable for production runs of real world applications.

Figure 4:
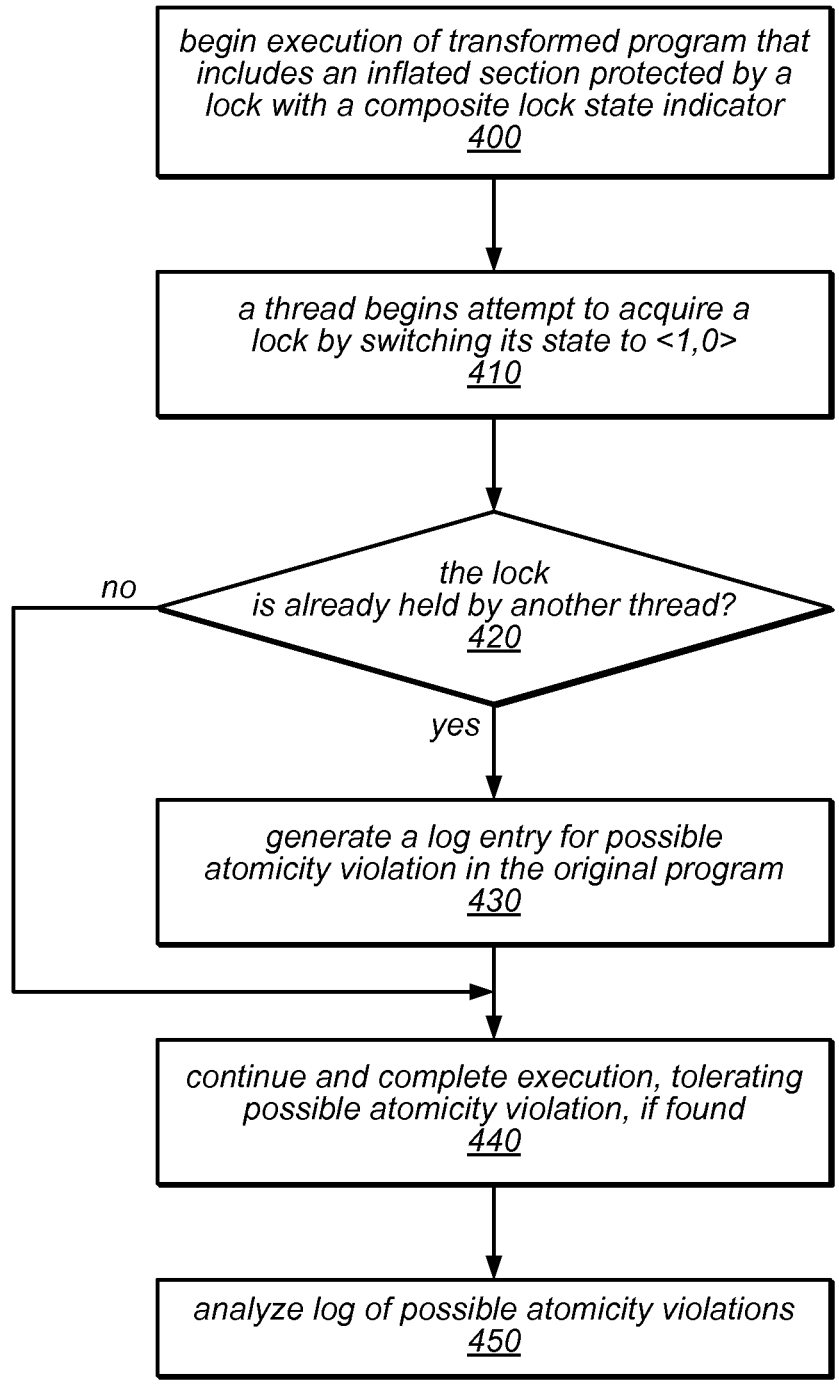
FIG. 4 is a flow diagram illustrating a method for detecting a possible atomicity violation dependent on a composite lock state indicator, according to one embodiment.

FIG. 4 illustrates a method for detecting a possible atomicity violation dependent on a composite lock state indicator, according to one embodiment. In this example, the method includes beginning execution of a transformed program that includes an inflated section protected by a lock, as in 400. In this example, the lock has (or is associated with) a composite lock state indicator, as described herein. In this example, a thread may attempt to acquire the lock by switching its state to <1,0>, as in 410. If the lock is already held (i.e. if the lock has already been acquired by another thread), the lock may already be in state <1,0> or <1,1> (shown as the positive exit from 420). This may indicate that in the original program, the thread would have been likely to access one or more shared objects in an unprotected fashion, potentially leading to an atomicity violation. In other words, if a thread that attempts to acquire a lock by changing its state to <1,0> determines that the lock is already held (i.e. that its state is <1,0> or <1,1>), this may indicate a potential atomicity violation in the original program code. In this case, a log entry may be generated for this possible atomicity violation, as in 430. Note that this log entry may in various embodiments serve as an atomicity violation warning, and may or may not represent an actual atomicity violation. Note that, in general, any time a thread attempts to acquire a lock and determines that its state is <1,0>, this may indicate a potential atomicity violation in the original program code, regardless of whether the thread is attempting to change the state of the lock to <1,0> or to <1,1>.

Note that if the lock state indicates that the lock was not already held, shown as the negative exit from 420, the thread may acquire the lock and continue execution. In this case, there may not be any potential atomicity violations (or warnings thereof) to record in the log. After logging the atomicity violation warning (or if no such warnings are required), the method may include continuing (and eventually completing) execution of the transformed program, while tolerating the possible atomicity violations that were discovered, as in 440. For example, in various embodiments, one or more of the transformations illustrated in FIG. 2 and/or described herein may have been applied to the original code of the program to create an alternate program that tolerates the detected types of potential atomicity violations. In such embodiments, the transformed program may execute correctly to completion, even if execution of the original code would have resulted in one or more atomicity violations. Note that while the transformed program continues execution, one or more other possible atomicity violations may be discovered (e.g., atomicity violations of the same type or of a different type) and corresponding entries may be added to the log of atomicity violation warnings (not shown). As illustrated at 450 in FIG. 4, in some embodiments, the method may include analyzing the log of possible atomicity violations (i.e. atomicity violation warnings). In various embodiments, this analysis may include an automated analysis of some or all of the logged information and/or a manual analysis of some or all of the logged information (e.g., by the programmer).

Note that arbitrary inflation of critical sections can be problematic in certain scenarios. A classic example of such a scenario is the use of a critical section to spin on the state of a shared object. In this scenario, a thread acquires a lock, retrieves the value of the object protected by the lock, releases the lock, and finally checks the value that it retrieved. This code sits in a loop that terminates when the retrieved value satisfies a specified condition. Inflating this synchronized block beyond the scope of the loop can easily lead to deadlock in the application. Furthermore, the control flow of this idiom can be arbitrarily complicated. In some cases the compiler may have to make conservative assumptions about the nature of the loop, and may even have to give up on the synchronized block inflation. Note that a key characteristic of such loops is that they are always indefinite. Thus, in some embodiments, a boundary condition for synchronized block inflation is that the inflation cannot happen across an indefinite loop unless the compiler can prove that there is no control flow dependency between the values retrieved from the synchronized block an the loop termination condition. Only in that case may the critical section be inflated beyond the scope of indefinite loops. More generally, it may be a restriction in some embodiments that a synchronized block cannot be inflated across condition synchronizations.

Note that, in some cases, inflating synchronized blocks can lead to a deadlock situation. For example, consider the programming idiom in which a thread gets object A from a collection and gets object B from the same (or another) collection, both using synchronized blocks, and then swaps them. Concurrently, another thread may perform the same operation in reverse order. Inflating the two synchronized blocks can easily lead to a deadlock between the two threads that never existed in the original program. Fortunately, managed runtimes, like the JVM, are typically equipped with deadlock detection tools, and can thus detect a deadlock in such cases. In such managed systems, once a deadlock is detected, the runtime system can break the deadlock by releasing a lock that would have been already released (or not yet acquired) in the original program, or by arbitrarily releasing one or more locks, in different embodiments.

Note that the results produced by data race detection tools are typically infested with false positives, which makes tracking the generated output log cumbersome. In some cases, the techniques described herein for detecting atomicity violations can also produce such false positives. More specifically, there may be instances in which the application of synchronized block inflation is over-aggressive, and needs to be scaled back in order to reduce or eliminate false positives emerging from the inflation of at least some of the blocks. In some embodiments, various filtering techniques may be applied to at least significantly reduce such over-aggressive inflations. In some such embodiments, an aggressive application of the critical section inflation techniques described herein may be applied to the original program code in a first compilation, and one or more of these inflations may be rolled back out of the alternate code (e.g., based on filtering or other runtime analysis techniques) in a second or other subsequent compilation.

Figure 5:
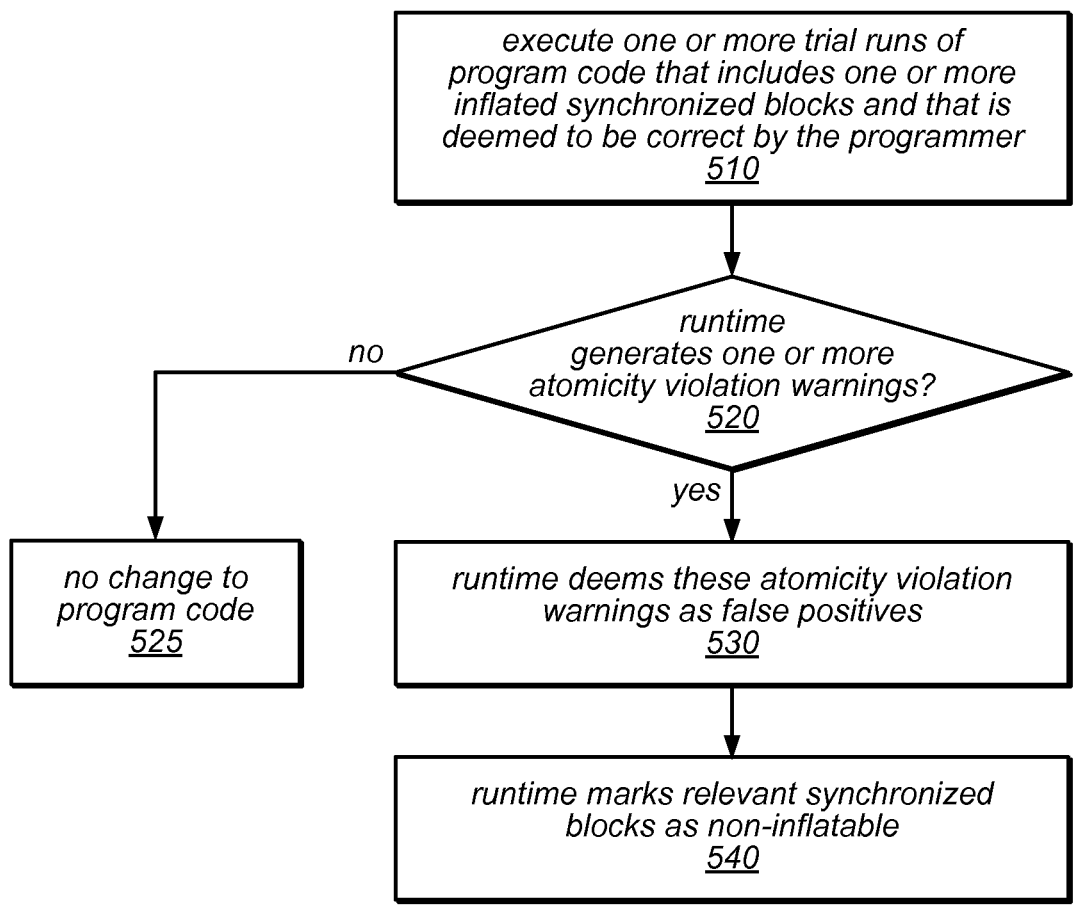
FIG. 5 is a flow diagram illustrating a method for detecting, and subsequently avoiding, false positive atomicity violations dependent on one or more trial runs, according to one embodiment.

In some embodiments, data race false positives (including, for example, those resulting from over-aggressive synchronized block inflation) may be reduced through the use of trial runs and/or other types of static or runtime analysis. For example, FIG. 5 illustrates a method for detecting, and subsequently avoiding, false positive atomicity violations dependent on one or more trial runs, according to one embodiment. In this example, the method may include executing one or more trial runs of program code that has been deemed to be correct by the user (e.g., the programmer), as in 510. The program code may include one or more inflated synchronized blocks, as described herein.

As illustrated in FIG. 5, in some embodiments, the runtime system may use this information (i.e. the information that the program code has been deemed as being correct) to determine which, if any synchronized block inflations lead to atomicity violation warnings in the trial runs. For example, if one or more atomicity violation warnings are generated by the runtime during execution of the program code (shown as the positive exit from 520), the method may include the runtime and deeming those atomicity violations as false positives, as in 530. In this case, the runtime may subsequently use this information (i.e. the fact that the atomicity violations have been deemed to be false positive) to mark the affected synchronized blocks as non-inflatable, as in 540. In this case, marking these blocks as non-inflatable may avoid at least these sources of false positive data races during a subsequent compilation/execution of the program code.

Note that if no atomicity violation warnings are generated during the trial runs, shown as the negative exit from 520, there may be no changes needed in the transformed program code, as in 525. In other words, there may be no need to avoid these types of data races (those resulting from synchronized block inflation).

In some cases, a trial-runs-based filtering technique may be insufficient to capture all false positives. In some embodiments, the system may provide an interface (e.g., as a component of a compiler, JIT compiler, or profiling tool that implements some or all of the techniques described herein) through which the programmer can provide feed back into the system (e.g., during production runs) indicating that certain detected violations were incorrect and should be discarded in the future. Such an interface may enable the programmer to express the violation site reasonably precisely (e.g., in terms of class file name, method name, and line number in the method). In some embodiments, the system may be configured to drop the inflation of the relevant critical section(s), i.e. those that resulted in false positives, by re-instrumenting the code (e.g., using the JIT compiler). Similarly, if the system detects that an inflated critical section frequently leads to deadlocks, it may be configured to permanently discard the corresponding block inflation.

Figure 6:
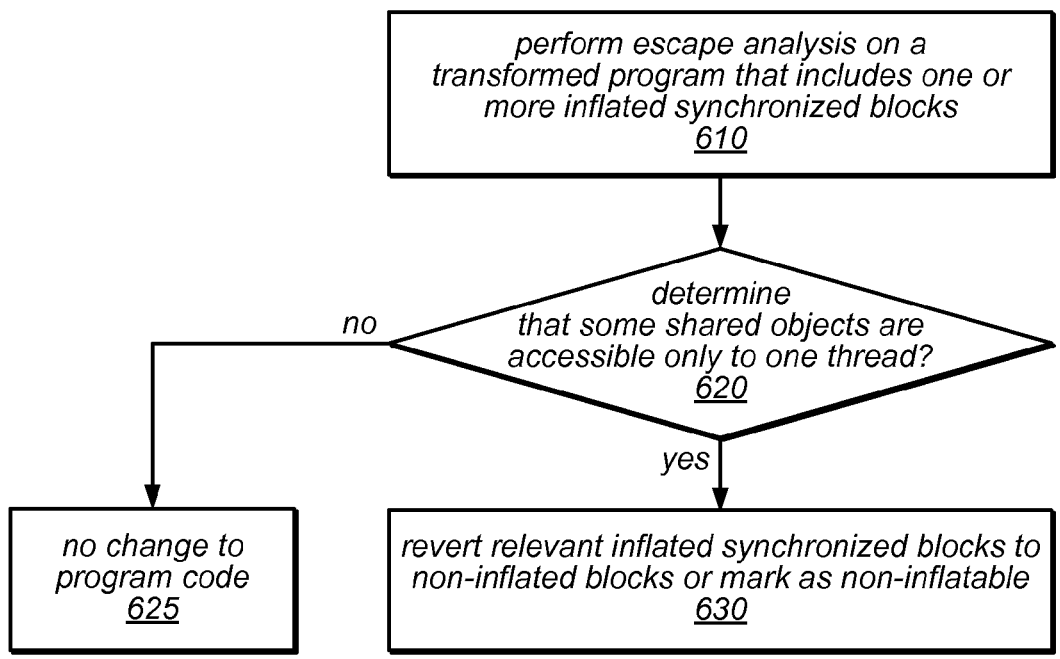
FIG. 6 is a flow diagram illustrating a method for avoiding over-aggressive synchronized block inflation using escape analysis, according to one embodiment.

FIG. 6 illustrates a method for avoiding over-aggressive synchronized block inflation using escape analysis (which may, in turn, result in avoiding some false positive data races), according to one embodiment. In this example, the method may include performing an escape analysis on a transformed program that includes one or more inflated synchronized blocks, as in 610. If, through this analysis, it is determined that the shared objects accessed from within particular inflated synchronized blocks are accessible only to one thread (shown as the positive exit from 620), the method may include reverting the relevant inflated synchronized blocks to non-inflated synchronized blocks, as in 630. In other words, these code sections may not need to be inflated because the shared objects they access cannot be accessed by another thread to result in an actual atomicity violation. In some embodiments, reverting the relevant inflated synchronized blocks to non-inflated synchronized blocks may include marking them as non-inflatable for subsequent compilation/execution of the program code.

Note that if the escape analysis does not identify any inflated synchronized blocks in which accesses to shared objects are accessible only to one thread (shown as the negative exit from 620), there may be no changes made in the transformed program code, as in 625. In other words, in this case there may be no evidence (based on the escape analysis) that any of the inflated synchronized blocks could be reverted to non-inflated synchronized blocks without leaving open the possibility of actual atomicity violations.

Note that inflation of critical sections (also known as lock coarsening in some contexts) has been used in commercial JVMs (e.g. the HotSpot™ JVM from Oracle) to reduce the latency induced by multiple acquisitions and releases of the same set of critical section locks. In general, such legacy systems propose two kinds of lock coarsening techniques: (i) "data lock coarsening", in which distinct locks are combined into a single lock, and the program code is modified to replace lock acquire-release operations of the combined locks with a single lock acquire-release operation of the newly formed "composite lock"; and (ii) "computation lock coarsening", in which the object-lock mapping is not modified, but the sites of the lock acquisition and/or lock release operations are changed. The techniques described may be used in conjunction with computation lock coarsening techniques. However, it may be more difficult to use the data lock coarsening technique in conjunction with the composite lock state indicator described herein (one that distinguishes between the lock state in the original program and its runtime manifestation). A potential problem is an explosion of false positives because of the "sharing" of a lock across a group of objects that may or may not be accessed together at run time.

As an example, consider two objects, A and B, which had their own individual locks in the original program. A data lock coarsening technique might determine that these two locks can be coalesced together into a single lock. However, it may be the case that some critical sections access just one of the two objects. As a result, the acquisition of the single lock by threads that are attempting to execute critical sections that access disjoint objects will certainly lead to false positives. One approach to combining data lock coarsening with the composite lock state indicators described herein may be to employ data lock coarsening only in cases in which all of the combined locks are guaranteed to be acquired together, all the time, in the original program. In some embodiments, such an approach may reduce or eliminate the aforementioned false positives. Other, more flexible solutions may be contemplated, in other embodiments.

Figure 7:
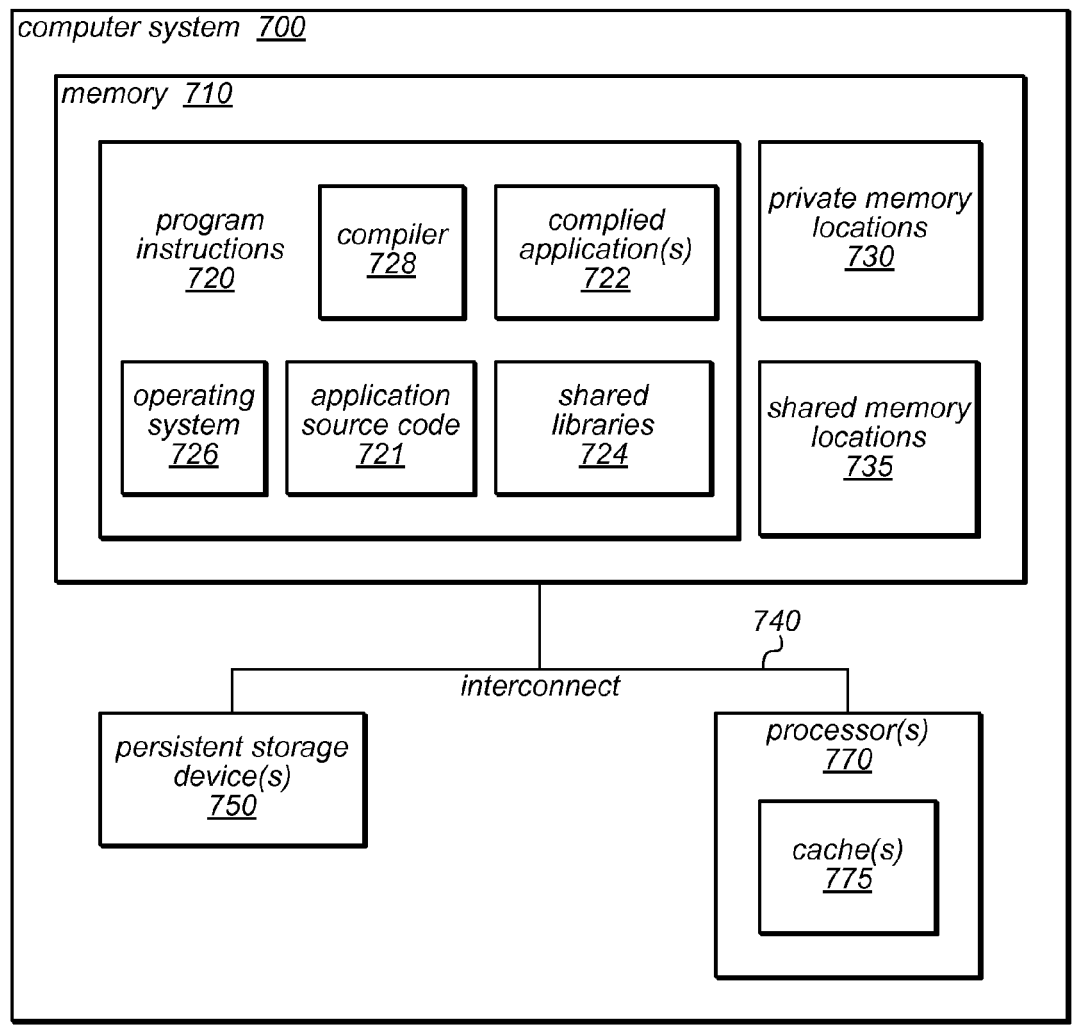
FIG. 7 illustrates a computing system configured to implement detecting and tolerating atomicity violations between concurrent code blocks and/or generating code executable to detect and tolerate such violations, according to various embodiments.

The techniques described herein may be implemented in any of a wide variety of computing systems. For example, FIG. 7 illustrates a computing system configured to implement detecting and tolerating atomicity violations between concurrent code blocks and/or generating code executable to detect and tolerate such violations, according to various embodiments. The computer system 700 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for detecting and tolerating atomicity violations between concurrent code blocks and/or for generating code that is executable to detect and tolerate such violations, as described herein, may be provided as a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 700 may include one or more processors 770, each of which may include multiple cores (any of which may be single or multi-threaded cores). For example, multiple processor cores may be included in a single processor chip (e.g., a single processor 770), and multiple processor chips may be included on a CPU board, two or more of which may be included in computer system 700. Each of the processors 770 may include cache 775, which may include a hierarchy of caches, in various embodiments. The computer system 700 may also include one or more persistent storage devices 750 (e.g. optical storage, magnetic storage, hard drive, tape drive, solid state memory, etc) and one or more system memories 710 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 7 (e.g., video cards, audio cards, additional network interfaces, peripheral devices, a network interface such as an ATM interface, an Ethernet interface, a Frame Relay interface, etc.)

The one or more processors 770, the storage device(s) 750, and the system memory 710 may be coupled to the system interconnect 740 and may communicate with each other through system interconnect 740. In general, interconnect 740 may be implemented as any broadcast, point-to-point, or hybrid communication mechanism such as a front side bus, Ethernet, InfiniBand™, etc.

One or more of the system memories 710 may contain program instructions 720. Program instructions 720 may be executable to implement application source code 721 (e.g., original program code to be transformed using various techniques described herein), one or more compiled applications 722 (e.g., transformed code that may include one or more accesses to a critical section or shared resource protected by a lock associated with a composite lock state indicator), a compiler 728 (which may include a JIT compiler or another type of compiler or profiling tool that is configured to perform some or all of the analyses and/or code transformations described herein and/or to generate executable code that detects and/or tolerates atomicity violations), shared libraries 724, and/or operating system 726. In various embodiments, program instructions 720 may be encoded in platform native binary, any interpreted language such as Java™ byte-code, or in any other language such as C/C++, Java™, etc., or in any combination thereof. In other words, in some embodiments, compiler 728, application source code 721, compiled applications 722, shared libraries 724, and operating system 726 may be implemented in the same programming language, while in other embodiments, they may be implemented in different programming languages (in various combinations). For example, in one embodiment, compiler 728, shared libraries 724, and operating system 726 may be Java™ based, while application source code 721 may be written using the C or C++ programming languages.

The program instructions 720 may include functions, operations and/or other processes for implementing detecting and tolerating atomicity violations between concurrent code blocks and/or for generating code that is executable to detect and tolerate such violations, as described herein. Such support and functions may exist in one or more of the shared libraries 724, operating system 726, compiler 728, application source code 721, and/or compiled applications 722, in various embodiments. The system memory 710 may further comprise private memory locations 730 and/or shared memory locations 735 where data may be stored. For example, private memory locations 730 may store data that is accessible only to specific threads (e.g., thread-local data), while shared memory locations 735 may store data accessible to multiple concurrently executing threads, processes, or transactions, in various embodiments. The data stored in private memory locations 730 and/or shared memory locations 735 may include any or all of (but is not limited to) data representing lock states (including in various composite lock state indicators), atomicity warnings, identifiers of code blocks marked as non-inflatable, escape analysis results, atomicity violation data collected during trial runs, data race information, false positive information, or any other data usable in performing the techniques described herein, in various embodiments. In addition, shared memory locations 735 may store data in shared objects that are accessible to concurrently executing threads, processes, or transactions, in various embodiments.

Although the embodiments above have been described in considerable detail, numerous variations and modifications will become apparent to those skilled in the art once the above disclosure is fully appreciated. For example, although many of the embodiments are described in terms of the use of a JIT compiler operating in a JVm environment, it should be noted that the techniques and mechanisms disclosed herein may be applicable in other contexts in which program code is analyzed, transformed, and/or executed using other types of compilers and/or profiling tools and/or in other types of execution environments. It is intended that the following claims be interpreted to embrace all such variations and modifications.

What is claimed:
1. A method, comprising:
 performing by a computer:
  analyzing program code to determine whether there exists a potential for atomicity violations between two or more sections of the code when they are executed by different threads;
  in response to determining that a potential for atomicity violations exists, transforming the program code into alternate code that when executed tolerates a potential atomicity violation in the program code discovered by said analyzing; and outputting the alternate code for execution on a multithreaded computer;
wherein said transforming comprises including in the alternate code acquisition and release operations targeting one or more locks, each of which protects a respective code section; and
wherein each of the locks is associated with a respective composite lock state indicator that comprises a current lock state indicator and an original lock state indicator.

2. The method of claim 1,
wherein said determining that a potential for atomicity violations exists comprises determining that one or more define-use chains exist between two or more nearby synchronized sections of the program code or between two or more nested synchronized sections of the program code;
wherein said transforming further comprises inflating a given one of the synchronized sections of the program code; and
wherein said inflating comprises one or more of: re-locating a lock release operation from one of the two or more nearby synchronized sections of the program code other than the given synchronized section of the program code to the end of the given synchronized section of the program code, re-locating a lock acquisition operation from one of the two or more nearby synchronized sections of the program code other than the given synchronized section of the program code to the beginning of the given synchronized section of the program code, or re-locating a lock release operation from an inner one of the two or more nested synchronized sections of the program code to the end of an outermost one of the two or more nested synchronized sections of the program code.

3. The method of claim 1, wherein, at a given execution point during execution of the alternate code:
the value of the original lock state indicator indicates whether the respective lock would have been held according to the program code prior to said transforming; and
the value of the current lock state indicator indicates whether the respective lock is being held.

4. The method of claim 1,
wherein said determining that a potential for atomicity violations exists comprises determining that an unsynchronized section of the program code accesses the same object or objects as a synchronized section of the program code; and
wherein said transforming further comprises injecting a lock acquisition operation and a corresponding lock release operation around the unsynchronized section of the program code, wherein the injected lock acquisition operation and the injected lock release operation target the lock that protects the synchronized section of the program code.

5. The method of claim 1,
wherein said determining that a potential for atomicity violations exists comprises determining that two or more nearby synchronized sections of the program code appear to access the same object or objects;
wherein said transforming further comprises coalescing two or more nearby synchronized sections of the program code into a single synchronized code section that comprises the two or more nearby synchronized sections of the program code and that is protected by a new lock; and wherein said coalescing comprises injecting a lock acquisition operation and a corresponding lock release operation around the single synchronized section of the program code, wherein the injected lock acquisition operation and the injected lock release operation target the new lock.

6. The method of claim 5, wherein, at a given execution point during execution of the alternate code:
the value of the original lock state indicator indicates that the new lock would not have been held according to the program code prior to said transforming; and
the value of the current lock state indicator indicates whether the new lock is being held.

7. The method of claim 1, further comprising executing the alternate code on the multithreaded computer, wherein said executing comprises detecting, at runtime, a possible atomicity violation in the program code dependent on the respective composite lock state indicator associated with a given one of the one or more locks.

8. The method of claim 7, further comprising logging an atomicity violation warning corresponding to the possible atomicity violation in a memory for subsequent analysis.

9. The method of claim 7, further comprising:
determining that the possible atomicity violation is a false positive rather than an actual atomicity violation in the program code; and
in response to determining that the possible atomicity violation is not an actual atomicity violation in the program code, causing a transformation of a code section corresponding to the false positive to be reversed.

10. The method of claim 1, wherein at least one of said analyzing and said transforming is performed by a compiler, a just-in-time compiler, or a profiling tool.

11. A system, comprising:
one or more processors; and
a memory coupled to the one or more processors and comprising program instructions that when executed by the one or more processors cause the one or more processors to implement a compiler;
wherein the compiler is configured to
analyze program code to determine whether there exists a potential for atomicity violations between two or more sections of the code when they are executed by different threads;
in response to determining that a potential for atomicity violations exists, transform the program code into alternate code that when executed tolerates a potential atomicity violation in the program code discovered by said analyzing; and
output the alternate code for execution;
wherein said transforming comprises including in the alternate code acquisition and release operations targeting one or more locks, each of which protects a respective code section; and
wherein each of the locks is associated with a respective composite lock state indicator that comprises a current lock state indicator and an original lock state indicator.

12. The system of claim 11,
wherein said determining that a potential for atomicity violations exists comprises one or more of: determining that one or more define-use chains exist between two or more nearby synchronized sections of the program code or between two or more nested synchronized sections of the program code, determining that an unsynchronized section of the program code accesses the same object or objects as a synchronized section of the program code, or determining that two or more nearby synchronized sections of the program code appear to access the same object or objects.

13. The system of claim 11,
wherein said transforming further comprises one or more of: inflating a given synchronized section of the program code, injecting a lock acquisition operation and a corresponding lock release operation around an unsynchronized section of the program code, or coalescing two or more nearby synchronized sections of the program code into a single synchronized code section that comprises the two or more nearby synchronized sections of the program code and that is protected by a new lock; and
wherein said inflating comprises one or more of: re-locating a lock release operation from one of two or more synchronized sections of the program code that are nearby the given synchronized section of the program code to the end of the given synchronized section of the program code, re-locating a lock acquisition operation from one of two or more synchronized sections of the program code that are nearby the given synchronized section of the program code to the beginning of the given synchronized section of the program code, or re-locating a lock release operation from an inner one of two or more nested synchronized sections of the program code to the end of an outermost one of the two or more nested synchronized sections of the program code.

14. The system of claim 11, wherein, at a given execution point during execution of the alternate code:
the value of the original lock state indicator indicates whether the respective lock would have been held according to the program code prior to said transforming; and
the value of the current lock state indicator indicates whether the respective lock is being held.

15. The system of claim 11, wherein when executed by the one or more processors, the program instructions further cause the one or more processors to implement executing the alternate code, wherein said executing comprises detecting, at runtime, a possible atomicity violation in the program code dependent on the respective composite lock state indicator associated with a given one of the one or more locks.

16. A non-transitory, computer readable storage medium storing program instructions that when executed on one or more computers cause the one or more computers to perform:
analyzing program code to determine whether there exists a potential for atomicity violations between two or more sections of the code when they are executed by different threads;
in response to determining that a potential for atomicity violations exists, transforming the program code into alternate code that when executed tolerates a potential atomicity violation in the program code discovered by said analyzing; and
outputting the alternate code for execution;
wherein said transforming comprises including in the alternate code acquisition and release operations targeting one or more locks, each of which protects a respective code section; and
wherein each of the locks is associated with a respective composite lock state indicator that comprises a current lock state indicator and an original lock state indicator.

17. The storage medium of claim 16,
wherein said determining that a potential for atomicity violations exists comprises one or more of: determining that one or more define-use chains exist between two or more nearby synchronized sections of the program code or between two or more nested synchronized sections of the program code, determining that an unsynchronized section of the program code accesses the same object or objects as a synchronized section of the program code, or determining that two or more nearby synchronized sections of the program code appear to access the same object or objects.

18. The storage medium of claim 16,
wherein said transforming further comprises one or more of: inflating a given synchronized section of the program code, injecting a lock acquisition operation and a corresponding lock release operation around an unsynchronized section of the program code, or coalescing two or more nearby synchronized sections of the program code into a single synchronized code section that comprises the two or more nearby synchronized sections of the program code and that is protected by a new lock; and
wherein said inflating comprises one or more of: re-locating a lock release operation from one of two or more synchronized sections of the program code that are nearby the given synchronized section of the program code to the end of the given synchronized section of the program code, re-locating a lock acquisition operation from one of two or more synchronized sections of the program code that are nearby the given synchronized section of the program code to the beginning of the given synchronized section of the program code, or re-locating a lock release operation from an inner one of two or more nested synchronized sections of the program code to the end of an outermost one of the two or more nested synchronized sections of the program code.

19. The storage medium of claim 16, wherein, at a given execution point during execution of the alternate code:
the value of the original lock state indicator indicates whether the respective lock would have been held according to the program code prior to said transforming; and
the value of the current lock state indicator indicates whether the respective lock is being held.

20. The storage medium of claim 16, wherein when executed on the one or more computers, the program instructions further cause the one or more computers to implement executing the alternate code, wherein said executing comprises detecting, at runtime, a possible atomicity violation in the program code dependent on the respective composite lock state indicator associated with a given one of the one or more locks.

* * * * *

UNITED STATES PATENT AND TRADEMARK OFFICE
CERTIFICATE OF CORRECTION

PATENT NO. : 8,732,682 B2  
APPLICATION NO. : 13/213830  
DATED : May 20, 2014  
INVENTOR(S) : Virendra J. Marathe et al.

It is certified that error appears in the above-identified patent and that said Letters Patent is hereby corrected as shown below:

On the Title Page:

Under item (73) "Assignee", please delete "Amazon Technologies, Inc.", and insert --Oracle International Corporation-- in place thereof.

Signed and Sealed this  
Twenty-sixth Day of August, 2014

Michelle K. Lee  
*Deputy Director of the United States Patent and Trademark Office*